United States Patent
Spacek

(10) Patent No.: US 6,524,327 B1
(45) Date of Patent: Feb. 25, 2003

(54) IN-SITU BONDS

(75) Inventor: Paul J. Spacek, Boston, MA (US)

(73) Assignee: Praxis, LLC, Mendon, MA (US)

( * ) Notice: Subject to any disclaimer, the term of this patent is extended or adjusted under 35 U.S.C. 154(b) by 257 days.

(21) Appl. No.: 09/676,851

(22) Filed: Sep. 29, 2000

(51) Int. Cl.⁷ .............................................. A61B 17/08
(52) U.S. Cl. ...................................................... 606/214
(58) Field of Search ................................ 606/214, 215; 523/111, 118; 524/795; 528/52, 53, 58; 560/103, 112, 129, 190, 330, 355, 360, 8, 81, 82, 91

(56) References Cited

U.S. PATENT DOCUMENTS

| | | | | |
|---|---|---|---|---|
| 4,743,632 A | * | 5/1988 | Marinovic | 523/118 |
| 5,173,301 A | * | 12/1992 | Itoh et al. | 424/445 |
| 5,266,608 A | * | 11/1993 | Katz et al. | 523/111 |
| 5,755,658 A | * | 5/1998 | Wallace et al. | 424/423 |
| 6,296,607 B1 | * | 10/2001 | Milbocker | 424/423 |

* cited by examiner

Primary Examiner—Ismael Izaguirre
(74) Attorney, Agent, or Firm—Don Halgren

(57) ABSTRACT

The invention relates to an organic hydrogel bond for living tissue. The bond is comprised of living tissue pre-treated with hydrogen peroxide, body derived fluids, including at least one NCO-terminated hydrophilic urethane prepolymer, which is derived from an organic polyisocyanate, and oxyethylene-based diols, triols or polyols comprised essentially all of hydroxyl groups capped with polyisocyanate.

16 Claims, No Drawings

IN-SITU BONDS

BACKGROUND OF THE INVENTION

1. Field of the Invention

This invention relates to synthetic surgical adhesives/sealants and tissue bonds created by reacting the adhesive with living in-situ tissue. More specifically, a unique tissue cross-linked polyurea-urethane bond is formed by reaction of isocyanate capped ethylene oxide diols, triols or polyols with activated living tissue.

2. Prior Art

Numerous urethane forming polyisocyanate reactions have been published, not all of them teach use as a surgical adhesive. Those that do teach use as a surgical adhesive do not teach the unique hydrogel/tissue bond formed in the present invention.

U.S. Pat. No. 4,994,542 (Matsuda et al) discloses a flexible surgical adhesive comprised of a NCO-terminated hydrophilic urethane prepolymer derived from a fluorine-containing polyisocyanate used alone or in combination with an unsaturated cyano compound. The high reactivity of fluorine-containing polyisocyanate capped urethane prepolymer with water makes it unlikely that such adhesives bond directly with untreated tissue. The addition of cyano compounds further increases the intra-polymer reactivity. These adhesives provide a mechanical bond by infiltrating fissures in the tissue rather than bonding directly to the nitrogenous groups of biological tissue. They consequently produce weaker bonds.

U.S. Pat. No. 5,173,301 (Itoh et al) discloses a NCO-terminated hydrophilic urethane prepolymer derived from an organic polyisocyanate and a polyol component comprising a polyester polyol derived from an electron-attracting group capable of being easily hydrolyzed within a living body. The present invention is not hydrolyzed in the body.

U.S. Pat. No. 4,743,632 (Marinovic) discloses a purified diisocyanate polyetherurethane prepolymer and polymers prepared by mixing the prepolymer with an organic filler to produce a space filling sealant. The purified preparations teach that each mole of diisocyanate prepolymer is substantially matched with one mole of a chain-extending compound. The purification process ensures no excess of isocyanate, and therefore the reaction proceeds slowly and only weakly bonds tissue.

U.S. Pat. No. 5,266,608 (Katz et al) discloses a non-elastomeric adhesive for bonding to calcified tissues. The present invention teaches an elastomeric adhesive.

U.S. Pat. No. 4,804,691 (English et al) discloses an adhesive comprised of a hydroxyl-terminated polyester reacted with 8 to 76 weight percent excess aromatic diisocyanate. The polyester-base polymer is degraded by the body.

U.S. Pat. No. 5,922,809 (Bhat et al) discloses an adhesive comprised of a polyisocyanate, polymers having isocyanate-reactive moieties, and a triol dispersion. The triol dispersion is not taught in the present invention.

As can be seen, many polyurethane prepolymer compositions have been patented. Some are strongly water reactive systems and tend to crosslink internally rather than with tissue. The resulting mechanical bond adheres to tissue, although it does not produce a chemical bond with cellular constituents. These bonds are weaker than those derived in the present invention, and are insufficient for general tissue adhesive use.

In addition, cure time is an important consideration in tissue adhesive formulation. Optimal cure time is less than 1 minute. Although fluorine-containing isocyanates are purported to be faster reacting, they still depend on diffusion of water into the prepolymer to be activated. Pre-mixing the prepolymer with water or providing a hygroscopic component to the prepolymer has not been taught. Tissue activation and rapid water uptake into the prepolymer are essential to achieve fast cures that bond tissue chemically.

Finally, an important feature of a surgical adhesive is biocompatibility. Those adhesives that attain strong adhesive properties use excess quantities of polyisocyanates. Unreacted polyisocyanates present toxicity risks. The present invention teaches a reactive wash to eliminate residual isocyanate activity. Additionally, a high oxyethylene content is important to achieve a fully hydrated tissue bond that resists chronic protein adsorption and denaturation. Continued protein denaturation can provoke a chronic inflammatory response in the body.

SUMMARY OF THE INVENTION

It is an object of the present invention to provide a chemical bond to living tissue that is biocompatible, elastomeric, and superior in strength.

It is another object of this invention to provide an adhesive combination for surgery having shortened cure time.

It is another object of this invention to provide an adhesive combination of lower toxicity to tissue.

The tissue bond of this invention is achieved by cross linking to living tissue and reacting the activated tissue with a pre-mixed aqueous solution of a high molecular weight ethylene oxide polyol or diol end-capped with an organic polyisocyanate.

It is one primary object of this invention to provide a surgical adhesive that is easily applied, cures quickly, and produces a strong tissue bond. The preparations disclosed here are liquids and can be stored at normal hospital room temperatures, and possess long shelf life.

It is a further object of this invention to provide a surgical adhesive that forms a stable polyurethane tissue bond that is inactivated before wound closure.

The invention thus comprises an organic hydrogel bond comprised of living tissue pre-treated with hydrogen peroxide, body derived fluids, at least one NCO-terminated hydrophilic urethane prepolymer, derived from an organic polyisocyanate and oxyethylene-based diols, triols or polyols comprised essentially all of hydroxyl groups capped with polyisocyanate. Substantially all of the prepolymer units are aliphatic or aromatic isocyanate-capped oxyethylene-based diols, triols or polyols. The molecular weight of the diols, triols or polyols prior to capping with polyisocyanate is at least 3,000. The polyisocyanate may be a toluene diisocyanate. The polyisocyanate may be isophorone diisocyanate. The polyisocyanate may be a mixture of xylene diisocyanate and 6-chloro 2,4,5-trifluoro-1,3 phenylene diisocyanate. The polyisocyanate may be a mixture of xylene diisocyanate and tetrafluoro-1,3-phenylene diisocyanate. The polyisocyanate may be a mixture of diphenylmethane diisocyanate and 6-chloro 2,4,5-trifluoro-1,3 phenylene diisocyanate. The polyisocyanate may be a mixture of diphenylmethane diisocyanate and tetrafluoro-1,3-phenylene diisocyanate. The polyisocyanate may be paraphenylene diisocyanate. The diols, triols or polyols are capped with polyisocyanate such that isocyanate-to-hydroxyl group ratio is between 1.5 and 2.5. The isocyanate concentration in the prepolymer units is preferably between 0.05 and 0.8 milliequivalents per gram.

The organic hydrogel bond may further comprise a surfactant to control foam density. The organic hydrogel bond may further comprise hydroxyethylcellulose. The organic hydrogel bond may further comprise hydroxypropyl-cellulose.

The invention in a further descriptive embodiment preferably comprises a tissue crosslinked hydrophilic hydrated bond prepared by reacting together tissue, body derived fluids and a prepolymer in a prepolymer-to-water ratio of 3:1 to 20:1, the prepolymer prepared by: selecting diols, triols or polyols, substantially all of which are oxyethylene-based diols, triols or polyols having an average molecular weight of 3,000 to about 15,000, and reacting the diols, triols or polyols with an aliphatic or aromatic polyisocyanate at an isocyanate-to-hydroxyl ratio of about 1.5 to 2.5 so that all of the hydroyl groups of the diols, triols or polyols are capped with polyisocyanate and the resulting prepolymer has an isocyanate concentration of no more than 0.8 milliequivalents per gram. Preferably substantially all of the diols, triols or polyols selected in (a) are oxyethylene-based. Preferably the diols, triols and polyols of step (a) are dissolved in an organic solvent selected from acetonitrile or acetone. The hydrated bond may further preferably comprise non-body derived water, ideally saline solution containing 0.9% NaCl. The ratio of aliphatic or aromatic polyisocyanate at an isocyanate-to-hydroxyl ratio may preferably be between 3:1 to 20:1. The hydrogel bond may be preferably washed with a polyfunctional diamine to end isocyanate reactivity. The hydrated bond tissue is preferably pretreated with 3% hydrogen peroxide.

The invention in a further embodiment preferably comprises a surgical adhesive for preparing a hydrophilic, biocompatible seal or bond characterized by elasticity, and resistance to decomposition within the body, said surgical adhesive comprising of a Part A including oxyethylene-based diols, triols or polyols having an average molecular weight in excess of 3,000, the diols, triols or polyols having all of the hydroxyl groups capped with an aromatic or aliphatic diisocyanate. The adhesive has an isocyanate concentration up to 0.8 meq/gm., and a Part B including a saline solution containing 0.9% NaCl and 3% H2O2 wherein the Parts A and B are premixed before tissue contact in Part A-to-Part B ratios of between 3:1 to 20:1 to create a surgical adhesive which creates a hemostatic tissue bond within about 3 minutes. The adhesive invention includes a fluorine containing diisocyanate which is added to the Part A. The adhesive invention includes a hygroscopic material which is added to the Part A. A surfactant is preferably added to the Part B. The adhesive invention also includes a hygroscopic material which is added to the Part A and a surfactant which is added to the Part B. The invention further includes a Part C to be applied after tissue contact of the mixed Parts A and B, the Part C comprised of a polyfunctional amine such as lysine to end isocyanate reactivity. The adhesive invention also preferably includes a method to enhance reactivity of the adhesive when added to tissue, comprising the step of: heating the adhesive to between 65–80 degrees C. before disposition on the tissue. The penetrating ability of the adhesive may be enhanced by the step of: mixing a acetonitrile solvent in part 2:1 to 1:10, adhesive to solvent to the adhesive.

The invention also comprises a method of establishing an organic hydrogel bond at a situs of living tissue comprising the steps of: pre-treating disparate portions of the living tissue with hydrogen peroxide, body derived fluids, at least one NCO-terminated hydrophilic urethane prepolymer, derived from an organic polyisocyanate, and oxyethylene-based diols, triols or polyols comprised essentially all of hydroxyl groups capped with polyisocyanate; and bonding the portions of the disparate living tissue together.

DETAILED DESCRIPTION OF THE INVENTION

The invention comprises a uniquely flexible, biocompatible, non-biologic tissue bond that can be produced by crosslinking hydrated polymer gels to nitrogenous components found in living tissue. The hydrated tissue bond is formed by reacting polymeric monomer units with tissue, at least 55% of which are oxyethylene-based diols, triols or polyols with molecular weight exceeding 10,000. The adhesive being comprised of hydroxyl groups of diols, triols or polyols substantially all capped by polyisocyanate, where non-polymerized polyisocyanate accounts for less than 4% (v/v) of the adhesive. Amines in the tissue serve to polymerize tissue with the adhesive. Water mixed or acquired at the bond site generates additional amine through reaction with polyisocyanate and serves to polymerize the bulk of the bond.

The diols, triols and polyols used in the tissue bond predominately or exclusively are polyoxyalkylene diols, triols or polyols whose primary building blocks are ethylene oxide monomer units. At least 55% of the units should be ethylene oxide to achieve good tissue adhesion. This adhesive system may contain proportions of propylene oxide (typically 25%) or butylene oxide (typically 15%) units in the polyols. The copolymerization of the allyl ether of M-PEG (or the corresponding "alkylene oxide" copolymer of propylene oxide and ethylene oxide) with maleic anhydride produces a series of comb-shaped, functional polymers that may be used. The anhydride groups of these polymers are reactive toward nucleophilic groups such as amino or hydroxyl, and thus it is possible to prepare protein-AO-MAL adducts in which polymer covers significant portions of the protein surface through multiple covalent linkages.

The isocyanate capped AO-MAL polymer forms polymer-protein conjugates with enhanced stability toward heat, pH, are soluble and active in aqueous and organic solvents, and have greatly reduced immunogeniocity in vivo. Varying the propylene oxide/ethylene oxide ratio offers the possibility of tailoring polymer hydrophilicity since inclusion of propylene oxide enhances hydrophobicity.

To obtain desirable adhesive viscosity and bond strength, high molecular weight ethylene oxide-based diol and polyols are used to prepare the adhesive. The diols, triols or polyols molecular weight prior to capping with polyisocyanate should be at least 10,000 MW. Triols (trihydroxy compounds) are suitable in the preparation of the polyols, and can serve as precursors to preparation of the adhesive of this invention. There are many suitable triols: triethanolamine, trimethylolpropane, trimethylolethane, and glycerol. Alternatively, tetrols may be used. Triol- or tetrol-based polyols are capped with polyfunctional isocyanate, preferably a diisocyanate.

Alternatively, diols may be used. High molecular weight polyethylene glycols are satisfactory. Diols are to be end capped with diisocyanates in addition with crosslinking compounds. Polyfunctional amines and isocyanates are suitable as crosslinking agents. Mixtures of diols, triols and polyols are also suitable.

The adhesive of this invention is formed by reacting the hydroxyl groups of the diols, triols or polyols with polyisocyanates. The choice of the polyisocyanate will depend on factors well known in the art, including precursor choice, cure time, and mechanical properties of the tissue bond formed by reacting the adhesive with tissue.

The choice of precursor is not independent of the choice of polyisocyanate. The choice must afford sufficient crosslinking to the tissue so as not to compete detrimentally with internal crosslinking initiated with the addition of water to the bond. This competition can be favorably biased in favor of the tissue bonding reaction by heating the adhesive, reducing its viscosity by addition of solvents, or adding macroscopic hygroscopic fillers. The choice must also afford rapid bulk polymerization—typically less than 60 seconds. Reduction in bulk polymerization time can be accomplished by heating the adhesive, pre-mixing the adhesive with water, or adding amines.

Aromatic polyisocyanates are preferred in the above embodiments because they result in cure times substantially less than times obtained when using aliphatic or cycloaliphatic polyisocyanates. However, aromatic polyisocyanates result in bonds of higher toxicity. For this reason the functionality of the polyisocyanates in the bond are quenched using lysine, or similar amine.

Examples of suitable (listed in descending order of suitability) polyfunctional isocyanates are found in the literature, and include the following and commonly obtained mixtures of the following:

9,10-anthracene diisocyanate
1,4-anthracenediisocyanate
benzidine diisocyanate
4,4'-biphenylene diisocyanate
4-bromo-1,3-phenylene diisocyanate
4-chloro-1,3-phenylene diisocyanate
cumene-2,4-diisocyanate
Cyclohexylene-1,2-diisocyanate
Cyclohexylene-1,4-diisocyanate
1,4-cyclohexylene diisocyanate
1,10-decamethylene diisocyanate
3,3'dichloro-4,4'-biphenylene diisocyanate
4,4'diisocyanatodibenzyl
2,4-diisocyanatostilbene
2,6-diisocyanatobenzfuran
2,4-dimethyl-1,3-phenylene diisocyanate
5,6-dimethyl-1,3-phenylene diisocyanate
4,6-dimethyl-1,3-phenylene diisocyanate
3,3'-dimethyl-4,4'diisocyanatodiphenylmethane
2,6-dimethyl-4,4'-diisocyanatodiphenyl
3,3'-dimethoxy-4,4'-diisocyanatodiphenyl
2,4-diisocyantodiphenylether
4,4'-diisocyantodiphenylether
3,3'-diphenyl-4,4'-biphenylene diisocyanate
4,4'-diphenylmethane diisocyanate
4-ethoxy-1,3-phenylene diisocyanate
Ethylene diisocyanate
Ethylidene diisocyanate
2,5-fluorenediisocyanate
1,6-hexamethylene diisocyanate
Isophorone diisocyanate
4-methoxy-1,3-phenylene diisocyanate
methylene dicyclohexyl diisocyanate
m-phenylene diisocyanate
1,5-naphthalene diisocyanate
1,8-naphthalene diisocyanate
polymeric 4,4'-diphenylmethane diisocyanate
p-phenylene diisocyanate
p,p',p"-triphenylmethane triisocyanate
Propylene-1,2-diisocyanate
p-tetramethyl xylene diisocyanate
1,4-tetramethylene diisocyanate
2,4,6-toluene triisocyanate
trifunctional trimer (isocyanurate) of isophorone diisocyanate
trifunctional biuret of hexamethylene diisocyanate
trifunctional trimer (isocyanurate) of hexamethylene diisocyanate Bulk curing of the tissue bond of this invention is achieved by using stoichiometric amounts of reactants. The isocyanate-to-hydroxyl group ratio should be as low as possible without inhibiting bonding function, typically 2+/−10%. Higher ratios achieve adequate bonds but result in excessive amounts of monomer in the bond. The time period used to cap the polyol or diol is dependent on the polyisocyanate used. Methods for polyisocyanate are well known.

In forming the tissue bond, organic solvents are usefully present during the polymerization with tissue to enable a greater tolerance of excessive isocyanate that may disrupt hydrate polymer formation. Varying the amount of solvent also varies the viscosity of the adhesive. The porosity of the tissue bond can be increased by reducing the viscosity of the adhesive, and conversely. Useful solvents are ethanol, acetonitrile and acetone.

In certain cases a tissue bond of minimal cured mass is desirable. This can be achieved by using large amounts of a volatile solvent, providing practical working volumes and minimal cured mass.

Bulk curing is accomplished by the addition of a stoichiometric excess of water or aqueous solution relative to the total available isocyanate groups. If blood or saline solution is present in the field, excess liquid should be removed by blotting away or through mixing into the adhesive. If liquid is present in a volume exceeding that of the adhesive to be applied, liquid should be removed from the site to prevent migration of the adhesive.

An adhesive-aqueous solution may be pre-mixed in ratios up to 1:1 to initiate polymerization and curing. Alternatively, the adhesive may be coated onto the site and coated with an amine to initiate bulk polymerization. Such methods are useful in obtaining near instantaneous tackiness and fixation.

The adhesive-to-aqueous solution ratio should be 1:1 to about 20:1, preferably about 5:1 to about 10:1. When matching the modulus of tissue, the adhesive-to-solution ratio should be 20:80. Bulk polymerization time, bond strength and bond porosity increases in the preferred ratios when the adhesive content increases.

Polymerization begins spontaneously upon contact with nitrogenous tissue or urea formed by reaction with water. The urea is formed when isocyanate groups of the oligomers react with water. Surface treatments, such as the use of hydrogen peroxide can increase the reactivity of tissue surfaces. Alternatively, the tissue may be infused with a catalyst such as lysine. Suitable infusion catalysts include primary and secondary polyamines and polyfunctional isocyanates.

The cure time may be shortened by addition of chain terminating or inactivation agents, which cause end-capping without chain extension. The tissue bond is a polyureaurethane.

When the object of the bond is to create a tissue seal, large proportions of volatile solvent may be added to the adhesive to affect a thin film coating.

The mechanical properties of the tissue bond described herein are unique and offer advantages over fibrin or cyanoacrylate tissue adhesive/sealant systems. In particular, the tissue bonds of this invention are less prone to cause an inflammatory response due to their hydrated state. Because the bond is hydrated, it is flexible offering longer bond life in application where tissue is likely to move relative to the bond.

The uniqueness of the present invention is further enhanced by its ability to form tissue bonds by incorporating liquids commonly found in the operating field.

The implantability of the bond of this invention relates to the bond's ability to present a surface of water to adjacent tissue. When the bonds of this invention are used in contact with water containing tissues, the ethylene oxide segments of the bond attract and complex with water molecules. Consequently, the surface presented to living cells is predominately a layer of water. The protective layer of water renders the underlying synthetic polymeric bond noninteractive with proteins. Consequently, the bond does not remove or denature proteins from the environment in which it is implanted.

It is known that aliphatic polyisocyanates are significantly less carcinogenic than those of aromatic isocyanates. However, if the aromatic polyisocyanates are used, careful washing for removal or reacting unreacted isocyanates and related amine-containing by-products generally will be sufficient to render the bond biocompatible.

In the preferred adhesive-to-aqueous solution ratios, the bond is substantially less susceptible to water swelling. Volumetric expansion may be 2-fold for bonds made with about a 1:5 adhesive-to-water ratio.

The tissue bonds and bulk polymerization of this invention are covalently extended and crosslinked and are not readily soluble or degradable in aqueous environments under physiological conditions. The physical integrity of the bond is maintained when implanted, reducing or eliminating problems with toxicity and contamination. Consequently, the bonds of this invention provide tissue-joining strength over extended periods with minimal loss of bond strength or integrity.

The examples that follow are given for illustrative purposes and are not meant to limit the invention described herein.

EXAMPLE I

Preparation of Adhesive A

Pluracol V10™ (BASF, propylene oxide/ethylene oxide) is to be deionized and dried. 2167.3 g deionized Pluracol V10 are to be mixed with 148.5 g isophorone diisocyanate (IPDI) and 0.84 g Santonox R™ (Monsanto Chemical Co.) and heated at 67 degrees C. under dry nitrogen for 17 days, or until isocyanate concentration reaches 0.4 meq/g. The appearance is clear, with a viscosity of 78,000 cps at 22° C. and 1.1 g/ml at 22° C. and free IPDI of approximately 1.5–3% (wt.).

EXAMPLE II

Preparation of Adhesive B

Pluracol V10™ (BASF, propylene oxide/ethylene oxide) is to be deionized and dried. 2170 g deionized Pluracol V10 are to be mixed with 82.4 g IPDI, 150 ml butadione. The mixture is to be heated to 67 degrees C. under dry nitrogen until isocyanate concentration reaches 0.2 meq/g.

EXAMPLE III

Preparation of Adhesive C

AO-MAL20™ (Shearwater Polymers, Inc., copolymer of M-PEG Allyl Ether and Maleic anhydride) is to be deionized and dried. 900 g deionized TPEG 15000 are to be mixed with 45 g IPDI and 0.6 g Santonox R. To this mixture 500 ml acetonitrile is to be added to obtain a liquid. The mixture is to be heated to 72 degrees C. under dry nitrogen until isocyanate concentration reaches 0.13 meq/g.

EXAMPLE IV

Preparation of Adhesive D

TPEG10000™ (Union Carbide Corp., polyethylene glycol) is to be deionized and dried. 1475 g deionized TPEG 10000 are to be mixed with 102.3 g IPDI and 0.79 g Santonox R. The reactants are to be dissolved in 87 ml acetonitrile. The mixture is to be heated to 72 degrees C. under dry nitrogen until isocyanate concentration reaches 0.43 meq/g.

EXAMPLE V

Preparation of Adhesive E

BASF#46889 (polyethylene glycol) is to be deionized and dried. 567 g deionized BASF#46889 are to be mixed with 59 g IPDI and 0.54 g Santonox R. The reactants are to be dissolved in 572 ml acetonitrile. The mixture is to be heated to 67 degrees C. under dry nitrogen until isocyanate concentration reaches 0.46 meq/g.

EXAMPLE VI

Preparation of Adhesive F

TPEG10000™ (Union Carbide Corp., polyethylene glycol) is to be deionized and dried. 475 g deionized TPEG 10000 are to be mixed with 102.3 g IPDI and 0.79 g Santonox R. The mixture is to be heated to 72 degrees C. under dry nitrogen until isocyanate concentration reaches 0.46 meq/g. To this mixture 100 g of acetone are to be added to form a liquid at room temperature.

EXAMPLE VII

Preparation of Adhesive G

Polyethylene glycol (PEG) (12000 MW) is to be deionized and dried. 0.03 moles PEG are to be mixed with 0.15 moles trimethylolpropane and heated to 60 degrees C. The heated mixture is to be combined, by stirring for one hour, with 0.11 moles commercial isomer blend of xylene diisocyanate. Stirring is to continue until the isocyanate concentration reaches an asymptote of 0.39 meq/g.

EXAMPLE VIII

Preparation of Adhesive H

Polyethylene glycol (PEG) (28000 MW) is to be deionized and dried. 0.04 moles PEG are to be mixed with 0.2 moles trimethylolpropane and heated to 60 degrees C. The heated mixture is to be combined, by stirring for one hour, with 0.1 moles commercial isomer blend of xylene diisocyanate. Stirring is to continue until the isocyanate concentration reaches an asymptote of 0.2 meq/g.

EXAMPLE IX

Preparation of Adhesive I

An adhesive is to be formed by following Example I, substituting an equivalent molar amount of commercial isomer blend of Toluene diisocyanate for the IPDI. The isocyanate content is to reach 0.8 meq/g. The. appearance should be a light amber liquid of about 10,000 cps, containing less than 3.5% free TDI.

EXAMPLE X

Preparation of Tissue Bond A

Five grams of Adhesive A are to be mixed with 1 g water for about 1 minute. The pot time of such an adhesive mixture is about 1 hr. The mixture is to be applied to living tissue. The crosslinked structure of tissue and Adhesive A are Tissue Bond A.

EXAMPLE XI

Preparation of Tissue Bond F

Adhesive G is to be applied directly to a tissue surface and mixed at the site with liquid present to reach a mixture of 1:5 water-to-adhesive. The cure time is 30–60 seconds. The crosslinked structure of tissue and Adhesive G are Tissue Bond F.

EXAMPLE XII

Preparation of Tissue Bond C

Adhesive I is to be heated to 65–80 degrees C. and applied directly to a tissue surface. The cure time is 30 seconds. The crosslinked structure of tissue and Adhesive I are Tissue Bond C.

EXAMPLE XIII

Preparation of Tissue Bond D

The tissue surface is to be swabbed with 3% hydrogen peroxide until the surface appears white. The treated surface is to be swabbed dry. Adhesive I is to be heated to 65–80 degrees C. and applied directly to a tissue surface. Preferably the adhesive layer on the tissue measures less than 1 mm in thickness. A second coat of saturated lysine solution is to be sprayed, but not mixed on the site. Fixing power is achieved immediately. The crosslinked structure of activated tissue, Adhesive I, and lysine are Tissue Bond D.

EXAMPLE XIV

Preparation of Tissue Bond E

Example XIII if followed except Adhesive I is premixed with equal volumes of acetonitrile and sprayed on the activated site. The crosslinked structure is adhesive immediately, but the acetonitrile is allowed to evaporate to create Tissue Bond E, a thin sealing layer.

The principles, preferred embodiments and modes of operation of the present invention have been described in the foregoing specification. The invention that is intended to be protected herein, however, is not to be construed as limited to the particular forms disclosed, since these are to be regarded as illustrative rather than restrictive. Variations and changes may be made by those skilled in the art without departing from the spirit of the invention.

What is claimed as new is:

1. A tissue crosslinked hydrophilic, biocompatible hydrated bond prepared by reacting together tissue pretreated with hydrogen peroxide, body derived fluids and a prepolymer in a prepolymer-to-water ratio of 3:1 to 20:1, said prepolymer prepared by:
   (a) selecting diols or polyols, substantially all of which are oxyethylene-based diols or polyols having an average molecular weight of 3,000 to about 30,000, and
   (b) reacting said diols or polyols with an aliphatic or aromatic polyisocyanate at an isocyanate-to-hydroxyl ratio of about 1.5 to 2.5 so that all of the hydroyl groups of said diols or polyols are capped with polyisocyanate and the resulting prepolymer has an isocyanate concentration of no more than 0.8 milliequivalents per gram.

2. The hydrated bond of claim 1 in which substantially all of the diols or polyols selected in (a) are oxyethylene-based.

3. The hydrated bond of claim 1 in which said diols and polyols of step (a) are dissolved in an organic solvent selected from acetonitrile or acetone.

4. The hydrated bond of claim 1 further comprising non-body derived water, ideally saline solution containing 0.9% NaCl.

5. The hydrated bond of claim 3 in which said ratio is between 3:1 to 20:1.

6. The hydrated bond of claim 1 in which the bond is washed with a polyfunctional diamine to end isocyanate reactivity.

7. A surgical adhesive for preparing a hydrophilic, biocompatible seal or bond characterized by elasticity, and resistance to decomposition within the body, said surgical adhesive comprising of a Part A including oxyethylene-based diols or polyols having an average molecular weight in excess of 3,000, said diols or polyols having all of the hydroxyl groups capped with an aromatic or aliphatic diisocyanate, and said adhesive having an isocyanate concentration up to 0.8 meq/gm., and a Part B including a saline solution containing 0.9% NaCl and 3% H2O2 wherein said Parts A and B are premixed before tissue contact in Part A-to-Part B ratios of between 3:1 to 20:1 to create a surgical adhesive which creates a hemostatic tissue bond within about 3 minutes.

8. The adhesive of claim 6 in which a fluorine containing diisocyanate is added to said Part A.

9. The adhesive of claim 6 in which a hygroscopic material is added to said Part A.

10. The adhesive of claim 6 in which a surfactant is added to said Part B.

11. The adhesive of claim 7 in which a hygroscopic material is added to said Part A and a surfactant is added to said Part B.

12. The adhesive of claim 6 further including a Part C to be applied after tissue contact of said mixed Parts A and B, said Part C comprised of a polyfunctional amine such as lysine to end isocyanate reactivity.

13. The adhesive of claim 7, including a method to enhance reactivity of said adhesive when added to tissue, including the step of:
   heating said adhesive to between 65–80 degrees C. before disposition on said tissue.

14. The adhesive of claim 7, including a method to enhance penetrating ability of said adhesive, including the step of:
   mixing a acetonitrile solvent in part 2:1 to 1:10, adhesive to solvent to said adhesive.

15. The adhesive of claim 8, including a method to enhance penetrating ability of said adhesive, including the step of:
   mixing a acetonitrile solvent in part 2:1 to 1:10, adhesive to solvent to said adhesive.

16. A method of establishing an organic hydrogel bond at a situs of living tissue comprising the steps of:
   pre-treating disparate portions of said living tissue with hydrogen peroxide, body derived fluids, at least one NCO-terminated hydrophilic urethane prepolymer, derived from an organic polyisocyanate, and oxyethylene-based diols, triols or polyols comprised essentially all of hydroxyl groups capped with polyisocyanate; and bonding said portions of said disparate living tissue together.

* * * * *